S. P. FOSTER.
ANCHOR FOR CHECK ROW WIRES.
APPLICATION FILED NOV. 12, 1917.
1,258,102. Patented Mar. 5, 1918.
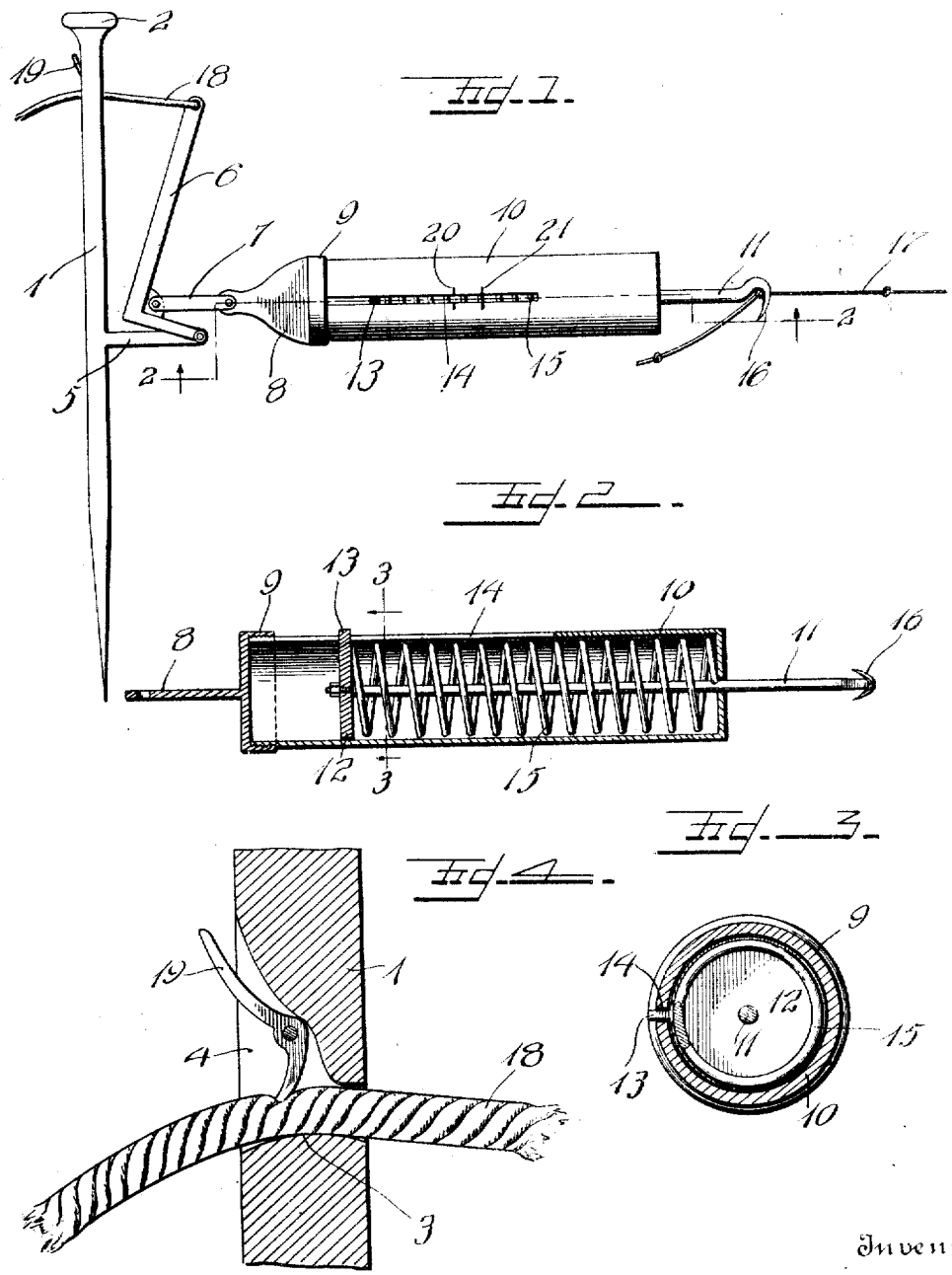
Witness
Robt. Hoge
Inventor
S. P. Foster
By H. B. Willson &Co
Attorneys

UNITED STATES PATENT OFFICE.

SAMUEL PERRY FOSTER, OF AUGUSTA, ILLINOIS.

ANCHOR FOR CHECK-ROW WIRES.

1,258,102.  Specification of Letters Patent.  Patented Mar. 5, 1918.

Application filed November 12, 1917. Serial No. 201,609.

*To all whom it may concern:*

Be it known that I, SAMUEL P. FOSTER, a citizen of the United States, residing at Augusta, in the county of Hancock and State of Illinois, have invented certain new and useful Improvements in Anchors for Check-Row Wires; and I do declare the following to be a full, clear, and exact description of the invention, such as will enable others skilled in the art to which it appertains to make and use the same.

My invention has for its object to provide an extremely simple and inexpensive, yet a highly efficient and durable anchoring stake for the ends of check row wires, provision being made whereby each time the wire is set, it will be placed under equal tension so that the hills of corn will be alined both longitudinally and transversely of the field, thus facilitating cultivation.

With the foregoing general object in view, the invention resides in the novel features of construction and unique combinations of parts to be hereinafter fully described and claimed, the descriptive matter being supplemented by the accompanying drawings which form a part of this specification and in which:

Figure 1 is a side elevation;

Fig. 2 is a horizontal section on the plane of the line 2—2 of Fig. 1;

Fig. 3 is a transverse section on the plane indicated by the line 3—3 of Fig. 2; and Fig. 4 is an enlarged section showing more particularly the cable guide and the dog for holding the cable.

In the drawings above briefly described, the numeral 1 designates a suitable stake having a head 2 at its upper end, said stake being formed with a cable guiding opening 3 below said head and having in one side a recess 4 which opens into said opening 3. A rigid arm 5 extends horizontally from the side of the stake 1 remote from the recess 4 and is spaced downwardly from said recess, said arm serving to support an angular lever 6 whose lower end is fulcrumed thereto.

One end of the link 7 is pivoted to the lever 6 at its angle, the other end of said link being pivoted to an ear 8 on a cap 9 which closes one end of a cylinder 10. A rod 11 passes through the other end of said cylinder and is provided on its inner end with a disk 12 having an indicator 13 which extends outwardly through a longitudinal slot 14 in the cylinder 10, a coiled spring 15 being interposed between the disk 12 and the end of the cylinder remote from the cap 9. The outer end of the rod 11 is provided with a hook or the like 16 for engagement with one end of the check row wire 17 as shown in Fig. 1.

A cable 18 is secured to the upper end of the lever 6, said cable passing through the guide opening 3, whereby a pull upon said cable will rock the lever so as to place the spring 15 under tension, thus properly holding the wire 17. In order to prevent return of the cable 18 through the opening 3, a cable gripping dog 19 is pivoted in the recess 4, the lower end of said dog engaging the cable as shown clearly in Fig. 4, whereas the upper end of the dog serves as a releasing handle.

In operation, the hook or the like 16 is engaged with the check wire 17 and spring 15 is placed under tension until the indicator 13 is opposite the point 20 of Fig. 1, this having been done the stake 1 is driven into the earth and the cable 18 is now pulled until the indicator 13 moves opposite point 21. By operating the device in this manner each time, it is insured that the tension on the check wire will be the same when planting all of the rows, and thus these rows will be alined both longitudinally and transversely of the field, to facilitate cultivation. The device is very simple and inexpensive, yet it will be obvious that the same will be highly efficient and durable. Since probably the best results are obtained from the several specific details shown and described, these details are preferably employed, but I wish it understood that within the scope of the invention as claimed, numerous minor changes may well be made.

I claim:

1. A check wire anchor comprising a stake having a cable guide near its upper end, a lever fulcrumed to said stake and having its upper end disposed opposite said guide, a wire tensioning device connected to said lever, a cable secured to said lever and passing slidably through said cable guide, whereby a pull upon said cable will rock said lever to set said tension device, and means for holding said cable against return through said guide.

2. A check wire anchor comprising a stake having near its upper end a cable guiding opening and a recess in one of its sides opening into said opening, an arm extending horizontally from the side of the stake opposite said recess and located below the latter, a lever fulcrumed at one end to said arm and having its other end disposed opposite said opening, a cylinder pivotally connected at one end to said lever and having a longitudinal slot, a rod slidable in said cylinder through the other end thereof, an indicator on said rod extending through the slot of the cylinder, a spring in said cylinder for resisting movement of said rod, means on the outer end of said rod for connecting it to the check wire, a cable secured to the upper end of said lever and sliding through said opening, whereby a pull on said cable will rock said lever to tension the spring and yieldably pull upon the check wire, and a dog pivoted in said recess to prevent return of the cable through said opening.

In testimony whereof I have hereunto set my hand in the presence of two subscribing witnesses.

SAMUEL PERRY FOSTER.

Witnesses:
JOHN C. MERIDETH,
J. H. RICE.